United States Patent
Liu et al.

(10) Patent No.: US 11,731,529 B2
(45) Date of Patent: Aug. 22, 2023

(54) POWER SUPPLY APPARATUS, BATTERY MANAGEMENT SYSTEM, POWER SUPPLY SYSTEM, CONTROL METHOD AND MEDIUM

(71) Applicant: Contemporary Amperex Technology Co., Limited, Ningde (CN)

(72) Inventors: Zhong Liu, Ningde (CN); Shuyun Xiong, Ningde (CN); Jinbo Cai, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 150 days.

(21) Appl. No.: 17/463,521

(22) Filed: Aug. 31, 2021

(65) Prior Publication Data
US 2022/0185145 A1 Jun. 16, 2022

Related U.S. Application Data

(63) Continuation of application No. PCT/CN2020/136984, filed on Dec. 16, 2020.

(51) Int. Cl.
*H02J 7/00* (2006.01)
*B60L 58/18* (2019.01)
(Continued)

(52) U.S. Cl.
CPC ............... *B60L 58/18* (2019.02); *B60L 15/20* (2013.01); *B60L 50/60* (2019.02); *B60L 58/12* (2019.02);
(Continued)

(58) Field of Classification Search
CPC .......... B60L 58/12; B60L 58/18; B60L 58/20; B60L 15/20; B60L 50/60; B60L 2210/10;
(Continued)

(56) References Cited

U.S. PATENT DOCUMENTS 10,118,498 B2 11/2018 Li et al.
2010/0019729 A1* 1/2010 Kaita ...................... B60L 58/25
320/134
(Continued)

FOREIGN PATENT DOCUMENTS

CN 104638291 A 5/2015
CN 206954014 U 2/2018
(Continued)

OTHER PUBLICATIONS

The extended European search report for EP Application No. 22157792.7, dated Jul. 18, 2022, 5 pages.
(Continued)

*Primary Examiner* — Zixuan Zhou
(74) *Attorney, Agent, or Firm* — East IP P.C.

(57) ABSTRACT

The embodiments of the present application provide a power supply apparatus, a battery management system, a power supply system, a control method and a medium. The method includes: controlling, under a condition that a vehicle is in a parking state, a first battery pack of a power supply apparatus to supply power to a first load of the vehicle, and controlling the first battery pack and a second battery pack of the power supply apparatus to stop supplying power to a second load of the vehicle; acquiring, in a process of supplying power to the first load, a capacity parameter of the first battery pack; controlling, under a condition that the capacity parameter of the first battery pack is lower than a first preset capacity threshold, a direct current converter to transmit electric energy of the second battery pack to the first battery pack.

13 Claims, 4 Drawing Sheets

(51) Int. Cl.
  *B60L 50/60* (2019.01)
  *B60L 15/20* (2006.01)
  *B60L 58/12* (2019.01)
  *H02J 7/34* (2006.01)
  *B60L 58/20* (2019.01)

(52) U.S. Cl.
  CPC ............ *B60L 58/20* (2019.02); *H02J 7/0014* (2013.01); *H02J 7/00032* (2020.01); *H02J 7/0048* (2020.01); *H02J 7/342* (2020.01); *B60L 2210/10* (2013.01); *B60L 2270/00* (2013.01); *H02J 2207/20* (2020.01)

(58) Field of Classification Search
  CPC . B60L 2270/00; H02J 7/00032; H02J 7/0014; H02J 7/0048; H02J 7/342; H02J 2207/20
  USPC .................................. 320/103, 109; 701/22
  See application file for complete search history.

(56) References Cited

U.S. PATENT DOCUMENTS

2012/0056597 A1   3/2012   Nagase
2015/0336474 A1   11/2015  Okaniwa
2018/0319287 A1*  11/2018  Forssell .............. H01M 50/204

FOREIGN PATENT DOCUMENTS

| | | |
|---|---|---|
| CN | 108674188 A | 10/2018 |
| CN | 108791120 A | 11/2018 |
| CN | 109861539 A | 6/2019 |
| CN | 209896733 U | 1/2020 |
| CN | 110920393 A | 3/2020 |
| CN | 106740206 B | 7/2020 |
| CN | 111555614 A | 8/2020 |
| CN | 111993954 A | 11/2020 |
| DE | 102010041998 A1 | 4/2012 |
| EP | 3163710 A1 | 5/2017 |
| KR | 20210076407 A | 6/2021 |

OTHER PUBLICATIONS

The First Office Action for European Application No. 20880328.8, dated Aug. 31, 2022, 3 pages.
The First Office Action for European Application No. 22157792.7, dated Oct. 27, 2022, 4 pages.
The Second Office Action for European Application No. 20880328.8, dated Dec. 23, 2022, 4 pages.
The International search report for PCT Application No. PCT/CN2020/136984, dated Aug. 27, 2021, 12 pages.
The extended European search report for EP Application No. 20880328.8, dated Nov. 22, 2021, 7 pages.

* cited by examiner

POWER SUPPLY APPARATUS, BATTERY MANAGEMENT SYSTEM, POWER SUPPLY SYSTEM, CONTROL METHOD AND MEDIUM

CROSS-REFERENCE TO RELATED APPLICATION

This application is a continuation of International Application No. PCT/CN2020/136984 filed on Dec. 16, 2020, which is incorporated herein by reference in its entirety.

TECHNICAL FIELD

The present application relates to the field of battery technology, and in particular, to a power supply apparatus, a battery management system, a power supply system, a control method and a medium.

BACKGROUND

With the development of new energy technologies, new energy has been adopted as power in more and more fields. Due to the advantages of high energy density, recyclable charging, safety and environmental protection and the like, power batteries are widely used in the fields of new energy vehicles, energy storage systems and the like.

In the field of new energy vehicles, issues of power supply strategies of the new energy vehicles have gradually attracted public attention. However, in an existing power supply strategy, a battery pack can be used to output a voltage of 12V, or a direct current-direct current (DCDC) converter can be used to convert the 12V output voltage of the battery pack to 48V. The entire power supply strategy is relatively simple.

SUMMARY

Embodiments of the present application provide a power supply apparatus, a battery management system, a power supply system, a control method and a medium.

In a first aspect, an embodiment of the present application provides a control method for a power supply apparatus, the control method being applicable to a battery management system BMS and including:

controlling, under a condition that a vehicle is in a parking state, a first battery pack of the power supply apparatus to supply power to a first load of the vehicle, and controlling the first battery pack and a second battery pack of the power supply apparatus to stop supplying power to a second load of the vehicle;

acquiring, in a process of supplying power to the first load, a capacity parameter of the first battery pack;

controlling, under a condition that the capacity parameter of the first battery pack is lower than a first preset capacity threshold, a direct current converter to transmit electric energy of the second battery pack to the first battery pack.

In a second aspect, an embodiment of the present application provides a control method for a power supply apparatus, the control method being applicable to a battery management system BMS and including:

controlling, under a condition that a vehicle is in a driving state, a first battery pack of the vehicle to supply power to a first load of the vehicle, and controlling the first battery pack and a second battery pack of the vehicle to supply power to a second load;

acquiring, in a process of supplying power to the first load and the second load, a capacity parameter of the first battery pack and a capacity parameter of the second battery pack;

controlling, under a condition that an absolute value of a difference between the capacity parameter of the first battery pack and the capacity parameter of the second battery pack is greater than a preset threshold, a direct current converter to transmit electric energy of a high-capacity battery pack to a low-capacity battery pack, wherein the high-capacity battery pack is a battery pack with a higher capacity parameter of the first battery pack and the second battery pack, and the low-capacity battery pack is a battery pack with a lower capacity parameter of the first battery pack and the second battery pack of the vehicle.

In a third aspect, an embodiment of the present application provides a battery management system BMS, the BMS being installed in a vehicle and including:

a first control module configured to control, under a condition that the vehicle is in a parking state, a first battery pack of a power supply apparatus to supply power to a first load of the vehicle, and to control the first battery pack and a second battery pack of the power supply apparatus to stop supplying power to a second load of the vehicle;

a first parameter acquisition module configured to acquire, in a process of supplying power to the first load, a capacity parameter of the first battery pack;

a second control module configured to control, under a condition that the capacity parameter of the first battery pack is lower than a first preset capacity threshold, a direct current converter to transmit electric energy of the second battery pack to the first battery pack.

In a fourth aspect, an embodiment of the present application provides a battery management system BMS, the BMS being installed in a vehicle and including:

a third control module configured to control, under a condition that the vehicle is in a driving state, the first battery pack of the vehicle to supply power to a first load of the vehicle, and to control the first battery pack and a second battery pack of the vehicle to supply power to a second load of the vehicle;

a second parameter acquisition module configured to acquire, in a process of supplying power to the first load and the second load, a capacity parameter of the first battery pack and a capacity parameter of the second battery pack;

a fourth control module configured to control, under a condition that an absolute difference between the capacity parameter of the first battery pack and the capacity parameter of the second battery pack is greater than a preset threshold, a direct current converter to transmit electric energy of a high-capacity battery pack to a low-capacity battery pack, wherein the high-capacity battery pack is a battery pack with a higher capacity parameter of the first battery pack and the second battery pack, and the low-capacity battery pack is a battery pack with a lower capacity parameter of the first battery pack and the second battery pack of the vehicle.

In a fifth aspect, an embodiment of the present application provides a power supply apparatus, the apparatus includes:

a first battery pack, wherein a positive electrode of the first battery pack is connected to a negative electrode of a second battery pack, the positive electrode of the first battery pack is also connected to one terminal of a first load via a first switch module, and a negative electrode of the first battery pack is connected to a first reference potential, wherein the other terminal of the first load is connected to a second reference potential;

the second battery pack, wherein a positive electrode of the second battery pack is connected to one terminal of a second load via a second switch module, wherein the other terminal of the second load is connected to a third reference potential;

a direct current converter, wherein one terminal of the direct current converter is connected to the positive electrode of the first battery pack, the other terminal of the direct current converter is connected to the positive electrode of the second battery pack, and the direct current converter is configured to perform energy transmission between the first battery pack and the second battery pack according to a control signal.

In a sixth aspect, a battery management system BMS is provided, and the battery management system includes: a memory configured to store programs;

a processor configured to run the programs stored in the memory to perform the control method for the power supply apparatus provided by the first aspect, any optional implementation of the first aspect, the second aspect, or any optional implementation of the second aspect.

In a seventh aspect, a computer storage medium having computer program instructions stored thereon is provided, wherein the computer program instructions, when being executed by a processor, implement the control method for the power supply apparatus provided by the first aspect, any optional implementation of the first aspect, the second aspect, or any optional implementation of the second aspect.

BRIEF DESCRIPTION OF THE DRAWINGS

The drawings required to describe embodiments of the present application are introduced briefly below to illustrate technical solutions of the embodiments of the present application more clearly. Obviously, the drawings described below are only some embodiments of the present application, and other drawings may be obtained by those ordinary skilled in the art from those drawings without any creative work.

DETAILED DESCRIPTION

The implementations of the present application will be further described in detail below with reference to the drawings and embodiments. The detailed description and drawings of the following embodiments are used to exemplarily illustrate the principles of the present application, and cannot be used to limit the scope of the present application, that is, the present application is not limited to the described embodiments.

In the description of the present application, it should be noted that, unless otherwise specified, "multiple" means two or more; orientations or positional relationships indicated by terms "upper", "lower", "left", "right", "inside", "outside" and the like are only for the convenience of describing the present application and simplifying the description, rather than indicating or implying that the referred apparatuses or elements must have a specific orientation, or must be constructed and operated in a specific orientation, and therefore it cannot be understood as a limitation of the present application. In addition, the terms "first", "second", "third" and the like are only used for descriptive purposes, and cannot be understood as indicating or implying relative importance. "Vertical" is not strictly vertical, but within an allowable range of error. "Parallel" is not strictly parallel, but within an allowable range of error.

The words of orientation appearing in the following description are all directions shown in the figures, and do not limit the specific structure of the present application. In the description of the present application, it should also be noted that, unless otherwise clearly specified and limited, the terms "installing", "coupling", and "connecting" should be understood in a broad sense, for example, it can be a fixed connection, a detachable connection, or an integral connection; it can be directly connected, or indirectly connected through an intermediate medium. For those of ordinary skill in the art, the specific meanings of the above-mentioned terms in the present application can be understood according to specific circumstances.

Figure 1:
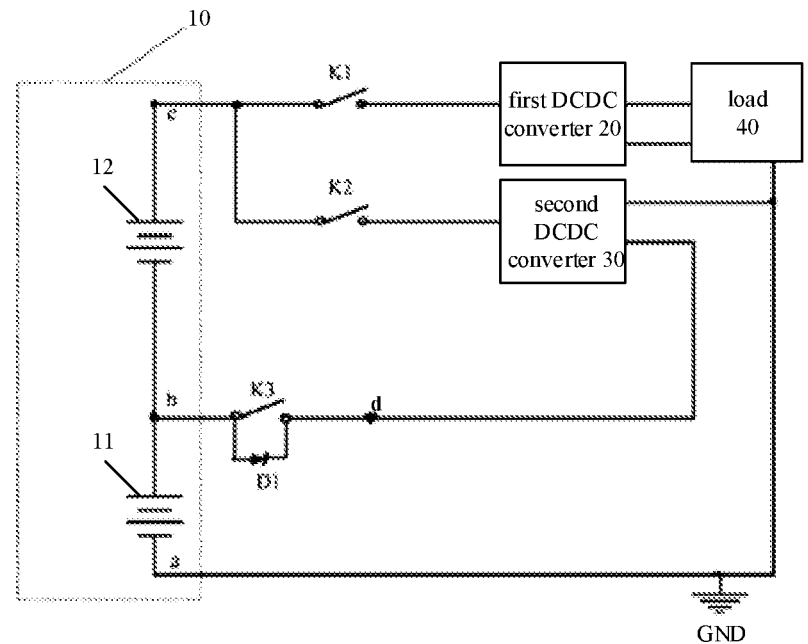
FIG. 1 a schematic structural diagram of a battery power supply system in a related technology.

In some cases, a battery power supply system is provided. FIG. 1 a schematic structural diagram of a battery power supply system in a related technology. As shown in FIG. 1, the battery power supply system specifically includes: a battery pack 10, a first direct current-direct current (DCDC) converter 20, a second DCDC converter 30, a load 40, a switch K1, a switch K2, a switch K3, and a diode D1 connected in parallel at two terminals of the switch K3. Wherein, the battery pack 10 includes a lithium iron phosphate battery 11 and a lithium iron phosphate battery 12.

Wherein, a positive electrode of the lithium iron phosphate battery 11 outputs a voltage of 12V, that is, the voltage at point b is 12V. After the lithium iron phosphate battery 11 and the lithium iron phosphate battery 12 are connected in series, a voltage of a positive electrode of the lithium iron phosphate battery 12 is 48V, that is, the voltage at point c is 48V. An input terminal of the first DCDC converter 20 is connected to the positive electrode of the lithium iron phosphate battery 12 through the switch K1, and an output terminal of the first DCDC converter 20 is connected to the load 40. An input terminal of the second DCDC converter 30 is connected to the positive electrode of the lithium iron phosphate battery 12 through the switch K2, and an output terminal of the second DCDC converter 30 is connected to the positive electrode of the lithium iron phosphate battery 11 through the switch K3.

Specifically, when the electric vehicle stops working, the switch K1 is turned on, the first DCDC converter 20 works, and outputs a first voltage, which can supply power to a low power consumption load 40 such as an alarm. The variation range of the first voltage may be 30V to 60V.

When the electric vehicle starts, the switch K2 is turned on, the second DCDC converter 30 works, and the second DCDC converter 30 converts the 48V voltage into a 14V voltage, and uses the 14V voltage to supply power to the load 40. At this time, since 14V is higher than the 12V voltage of the positive electrode of the first battery pack, the diode D1 is not conducting, and 14V cannot charge the first battery pack.

During the driving of the electric vehicle, the switch K2 and the switch K3 are turned on, the second DCDC converter 30 works, and the voltage output from the second DCDC converter 30 not only supplies power to the load 40, but also charges the lithium iron phosphate battery 11. At this time, if the second DCDC converter 30 fails, then the diode D1 is turned on, and the lithium iron phosphate battery 11 supplies power to low-voltage electrical devices, so as to ensure normal operations of the load 40.

However, in this power supply strategy, the first DCDC converter 20 and the second DCDC converter 30 are only used to change the output voltage of the power supply. When supplementing power for the lithium iron phosphate battery 11, K3 is controlled to be turned on, so that the 14V voltage output by the second DCDC converter 30 is greater than the 12V voltage of the positive electrode of the lithium iron phosphate battery 11, thereby enabling to charge the lithium iron phosphate battery 11. The flexibility of the power supply strategy is relatively simple, and the design of multiple DCDC converters also makes the power supply strategy inefficient.

In order to solve the existing technical problem, the embodiments of the present application provide a power supply scheme, which can be applied to a scenario where a vehicle is in a parking state. A voltage of a first battery pack can be used to supply power to a first load, and under a condition that a capacity parameter of the first battery pack is lower than a first preset capacity threshold, a direct current converter is used to transmit electric energy of a second battery pack to the first battery pack, thereby supplementing power for the first battery pack, which improves the flexibility of the power supply scheme.

The embodiments of the present application further provide another power supply scheme, which can be applied to a scenario where the vehicle is in a driving state. The first battery pack can be used to supply power to the first load, and the first battery pack and the second battery pack connected in series can be used to supply power to the second load. Between the first battery pack and the second battery pack, the battery pack with a higher capacity parameter can be used to supplement power for the battery pack with a lower capacity parameter, which improves the flexibility of the power supply scheme.

Firstly, in order to facilitate the understanding of the embodiments of the present application, the following parts will first specifically explain the concepts of the battery pack, the capacity parameter, the battery management system, and the DCDC converter.

(1) Battery pack.

In terms of scale, the battery pack in the embodiments of the present application may be a battery cell, a battery module, or a battery pack, which is not limited herein. Exemplarily, the voltage of the first battery pack may be 12V, and the voltage of the second battery pack may be 36V. Correspondingly, the voltage of the first battery pack and the second battery pack connected in series is 48V.

In terms of application scenarios, the battery pack can be used in a power unit such as a vehicle and a ship. For example, the battery pack can be used in an electric vehicle to supply power to a motor of the electric vehicle and serve as a power source of the electric vehicle. The battery can also supply power to other electrical devices in the electric vehicle, such as an air conditioner in the vehicle, a car player, etc. Exemplarily, the battery pack in the embodiments of the present application is applied to a hybrid electric vehicle. The hybrid electric vehicle has a pack-free design (that is, there is no high-voltage battery pack). At this time, the first battery pack and the second battery pack can not only serve as the power source of the hybrid electric vehicle, but also supply power to low-voltage electrical devices in the hybrid electric vehicle.

In terms of types, the battery pack in the embodiments of the present application can be a lithium-ion battery, a lithium metal battery, a lead-acid battery, a nickel-cadmium battery, a nickel-hydrogen battery, a lithium-sulfur battery, a lithium-air battery, or a sodium-ion battery, which is not limited herein. In one embodiment, the battery pack in the embodiments of the present application may be a ternary lithium battery. Compared with the scheme of selecting a lithium iron phosphate battery as the battery pack in the above related technology, the ternary lithium battery has a higher low-voltage platform, a larger specific capacity, and a higher energy density. Further, under a low temperature environment, such as under an environment of −30° C. to −10° C., the ternary lithium battery can guarantee the normal battery capacity. In another embodiment, the battery pack in the embodiments of the present application may be composed of different types of batteries. For example, the first battery pack may be a lithium iron phosphate battery, and the second battery pack may be a ternary lithium battery, so that the power supply apparatus can take into account the advantages of long life of the lithium iron phosphate battery and good low temperature performance of ternary battery.

(2) The capacity parameter of the battery pack. In the embodiments of the present application, the capacity parameter of the battery pack represents a parameter that can measure the capacity of the battery pack. In some embodiments, the capacity parameter of the battery pack may be at least one of a capacity value of the battery pack, an output voltage of the battery pack, and a state of charge (SOC) of the battery pack. Here, the SOC is a ratio of a remaining electric quantity of the battery under a certain discharge rate to a rated capacity under the same condition.

(3) The battery management system (BMS). The battery management system has the function of collecting/calculating battery parameters, as well as the function of managing various functional modules in the power supply apparatus and the battery pack. Exemplarily, the battery management system can control the energy transmission direction of the DCDC converter, can determine whether the capacity parameter of the battery pack is greater than a preset threshold, can determine the magnitudes of the capacity parameters between two battery packs, and can calculate the SOC.

(4) The DCDC converter. The DCDC converter is used for direct current voltage conversion, for example, an input first direct current voltage can be converted into a second direct current voltage for output. In one embodiment, the DCDC converter may be a bidirectional DCDC converter, that is to say, it can perform both step-up conversion and step-down conversion. Exemplarily, the DCDC converter can convert the 12V voltage into the 48V voltage, or can convert the 48V voltage into the 12V voltage.

Figure 2:
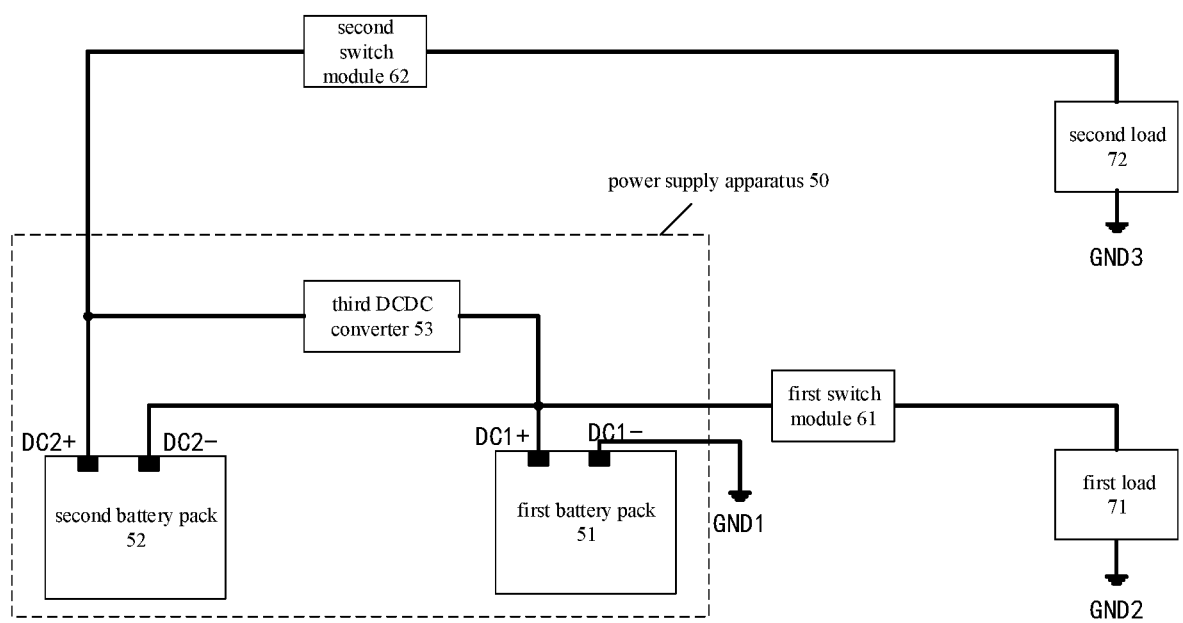
FIG. 2 is a schematic structural diagram of a power supply apparatus provided by an embodiment of the present application.

Secondly, before starting to introduce the control scheme of the power supply apparatus, the embodiments of the present application will first describe the power supply apparatus in the embodiments of the present application with reference to FIG. 2.

FIG. 2 is a schematic structural diagram of a power supply apparatus provided by an embodiment of the present application. As shown in FIG. 2, the power supply apparatus 50 includes a first battery pack 51, a second battery pack 52 and a third DCDC converter 53.

The following parts of the present application will sequentially elaborate on the structure and working logic of the power supply apparatus 50.

1. The connection structure of the power supply apparatus 50:

A positive electrode DC1+ of the first battery pack 51 is connected to a negative electrode DC2− of the second battery pack 52, and the positive electrode DC1+ of the first battery pack 51 is also connected to one terminal of a first load 71 through a first switch module 61. A negative electrode DC1− of the first battery pack 51 is connected to a first reference potential. Wherein, the other terminal of the first load 71 is connected to a second reference potential GND2. Exemplarily, as shown in FIG. 2, the first reference potential and the second reference potential may be ground terminals. Correspondingly, the first reference potential may be represented as GND1, and the second reference potential may be represented as GND2.

A positive electrode DC2+ of the second battery pack 52 is connected to one terminal of a second load 72 through a second switch module 62. Wherein, the other terminal of the second load 72 is connected to a third reference potential. Exemplarily, continuing to refer to FIG. 2, the third reference potential may be the ground terminal, and accordingly, the third reference potential may be represented as GND3.

One terminal of the third DCDC converter 53 is connected to the positive electrode DC1+ of the first battery pack 51, and the other terminal of the third DCDC converter 53 is connected to the positive electrode DC2+ of the second battery pack 52. The third DCDC converter 53 is configured to perform energy transmission between the first battery pack 51 and the second battery pack 52 according to a control signal. In some embodiments, the control signal may be sent by the BMS.

In some embodiments, continuing to refer to FIG. 2, the number of the DCDC converter in the power supply apparatus 50 is 1, that is, the DCDC converter in the power supply apparatus 50 only includes the third DCDC converter 53. Compared with the circuit shown in FIG. 1, the number of the DCDC converter is reduced, and only one DCDC converter is used to supply power the load and charge the battery pack, making the power supply strategy more efficient.

The power supply apparatus 50 provided by the embodiment of the present application can implement different power supply schemes through the switching control strategies of the first switch module 61 and the second switch module 62. For example, when the first switch module 61 is turned on and the second switch module 62 is turned off, the first battery pack 51 can be used to supply power to the first load 71; when the first switch module and the second switch module are turned on, the first battery pack 51 and the second battery pack 52 connected in series can be used to supply power to the first load 71 and the second load 72. In addition, the third DCDC converter 53 may perform energy transmission between the first battery pack 51 and the second battery pack 52, which improves control flexibility and improves the effect of balancing power consumption.

In some embodiments, the first switch module 61 and the second switch module 62 in the embodiments of the present application can each be implemented as: at least one mechanical switch, at least one semiconductor switch, or a hybrid switch composed of at least one mechanical switch and at least one semiconductor switch.

Here, the mechanical switch can be a relay or other mechanical switches, which is not limited herein. The semiconductor switch represents a switch made of semiconductor materials. Exemplarily, the semiconductor switch may be implemented as at least one of a triode, a metal-oxide-semiconductor field-effect transistor (MOSFET), an insulated gate bipolar transistor (IGBT) and the like, and the specific type of the semiconductor switch is not limit herein.

In some embodiments, the first switch module 61 and/or the second switch module 62 each include two transistors connected in series, and sources of the two transistors connected in series are connected. Wherein, each of the transistors is connected to a corresponding body diode, the source of each of the transistors is connected to an anode of the corresponding body diode, and a drain of each of the transistors is connected to a cathode of the corresponding body diode.

In this embodiment, the switch module is set as transistors connected by a common source, which can perform anti-reverse protection and improve the safety of the switch module. Even if the switch module is mis-operated for human reasons, damages can be prevented from the battery pack.

Figure 3:
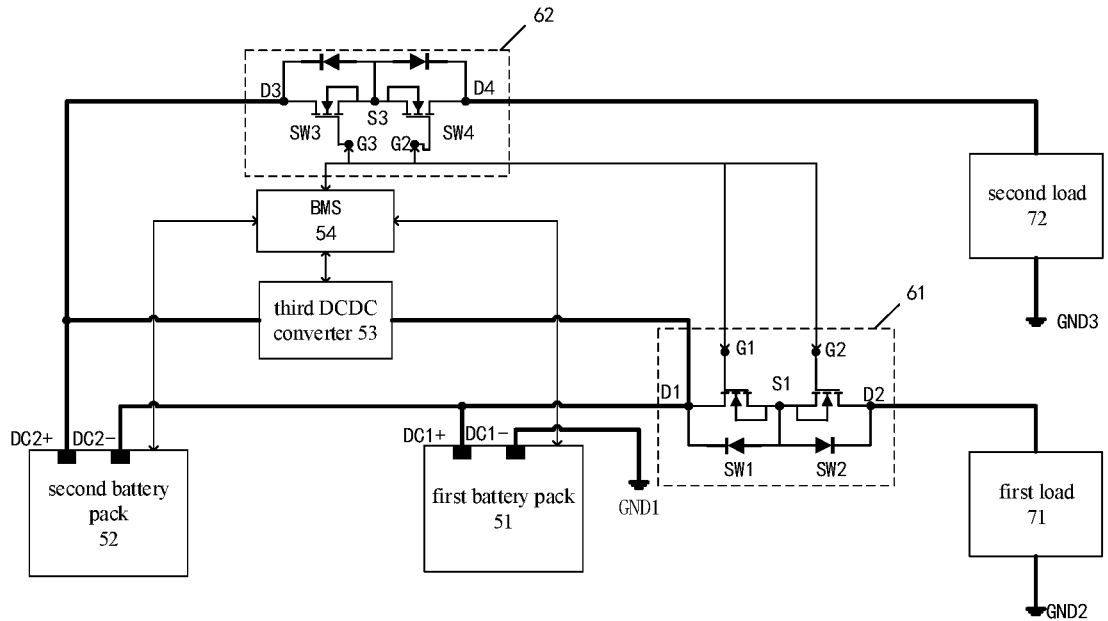
FIG. 3 is a schematic structural diagram of another power supply apparatus provided by an embodiment of the present application.

In order to facilitate the understanding of the specific structure of the switch module, the embodiments of the present application will be described with reference to FIG. 3. FIG. 3 is a schematic structural diagram of another power supply apparatus provided by an embodiment of the present application.

As shown in FIG. 3, the first switch module 61 and the first switch module 62 may be implemented as N-MOSFETs. The first switch module 61 includes a first MOS transistor SW1 and a second MOS transistor SW2. The sources S1 of the first MOS transistor SW1 and the second MOS transistor SW2 are connected, the drain D1 of the first MOS transistor SW1 is connected to the positive electrode DC1+ of the first battery pack 51, and the drain D2 of the second MOS transistor SW2 is connected to one terminal of the first load 71. The second switch module 62 includes a third MOS transistor SW3 and a fourth MOS transistor SW4. The sources S3 of the third MOS transistor SW3 and the fourth MOS transistor SW4 are connected, the drain D3 of the third MOS transistor SW3 is connected to the positive electrode DC2+ of the second battery pack 52, and the drain D4 of the fourth MOS transistor SW4 is connected to one terminal of the second load 72.

It should be noted that, the two switch modules can also be implemented as P-MOSFETs, the principle of which is similar to that of N-MOSFETs, and will not be repeated herein.

In some embodiments, the power supply apparatus 50 may further include a BMS 54 for controlling various modules of the power supply apparatus. Continuing to refer to FIG. 3, the BMS 54 can be connected to the control terminals of the MOS transistors SW1 to SW4, that is, the gates G1 to G4. The BMS 54 can output pulse signals to control each of the MOS transistors to turn on and turn off.

Further, the BMS 54 may also collect a battery state parameter (such as a voltage) from the first battery pack 51 and the first battery pack 52.

In addition, the BMS 54 may also control an energy transmission mode of the third DCDC converter 53. For example, the third DCDC converter 53 can be controlled to obtain electric energy from the second battery pack 52, and supplement power to the first battery pack 51 after a step-down process. Alternatively, the third DCDC converter 53 can be controlled to obtain electric energy from the first battery pack 51, and supplement power to the second battery pack 52 after a step-up process.

In some embodiments, the first load 71 may include a low-voltage electrical device in the vehicle. Regardless of whether the vehicle is started or not, the first load 71 needs the power supply apparatus to provide electric energy for it. For example, the first load 71 may be a window controller, a cigarette lighter, a dashboard, a smoke alarm and the like of the vehicle. Compared with the second load 72, the supply voltage required by the first load 71 may be a smaller value, such as 12V. It should be noted that, the 12V voltage is only a feasible example, and the embodiments of the present application do not limit the specific value of the first load 71, which can be set according to specific scenarios and actual requirements.

In some embodiments, the second load 72 may include a motor of the vehicle and an engine of the vehicle. When the vehicle is started, the second load 72 needs the power supply apparatus to provide electric energy for it. For example, the second load 72 may be a power unit of the vehicle, such as a motor, a generator, and the like. Compared with the first load 71, the supply voltage required by the second load 72 may be a larger value, such as 48V. It should be noted that, the 48V voltage is only a feasible example, and the embodiments of the present application do not limit the specific value of the second load 72, which can be set according to specific scenarios and actual requirements.

2. The working logic of the power supply apparatus 50:

Continuing to take FIG. 2 as an example, when the first switch module 61 is turned on, the first battery pack 51 and the first load 71 are connected, and the first battery pack 51 supplies power to the first load 71. When the first switch module 51 and the second switch module 52 are both turned on, the first battery pack 51 supplies power to the first load 71, and the first battery pack 51 and the second battery pack 52 are connected in series to supply power to the second load 72.

When the first switch module 61 is turned on and the second switch module 62 is turned off, the first battery pack 51 is in a power-consuming state, the second battery pack 52 is in a static state, and the third DCDC converter 53 can use the second battery pack 52 to supplement power to the first battery pack 51.

When the first switch module 61 and the second switch module 62 are turned on, the first battery pack 51 and the second battery pack 52 are both in the power-consumption state. At this time, energy balancing operation may be performed between the first battery pack 51 and the second battery pack 52 according to their capacity parameters.

After introducing the power supply apparatus in detail, the following parts of the embodiments of the present application will specifically describe a method provided by the embodiments of the present application in conjunction with the drawings, the method can control the power supply apparatus when the vehicle is in a parking state.

Figure 4:
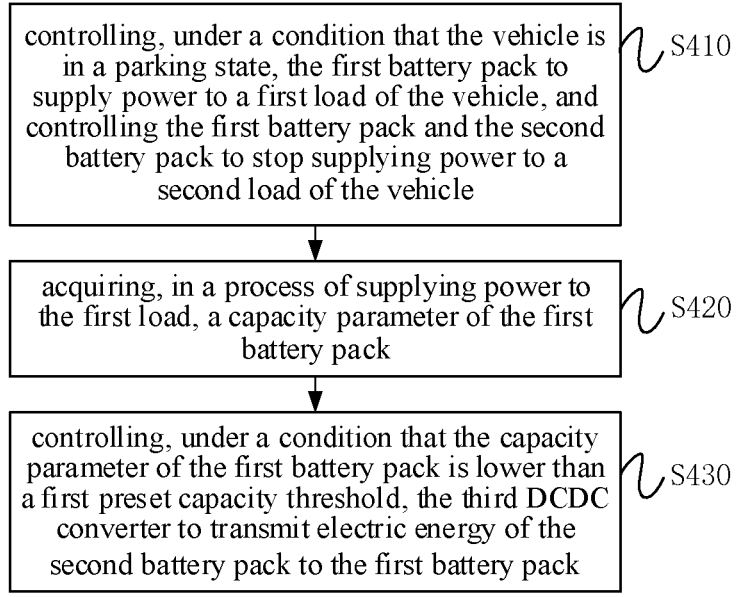
FIG. 4 is a schematic flowchart of a control method for a power supply apparatus provided by an embodiment of the present application.

FIG. 4 is a schematic flow chart of a control method for a power supply apparatus according to an embodiment of the present application. As shown in FIG. 4, the control method 400 for the power supply apparatus includes S410 to S430. Wherein, the execution subject of each step of the control method 400 for the power supply apparatus may be a BMS.

S410: controlling, under a condition that a vehicle is in a parking state, a first battery pack of the power supply apparatus to supply power to a first load of the vehicle, and controlling the first battery pack and the second battery pack of the power supply apparatus to stop supplying power to a second load of the vehicle.

In some embodiments, the parking state in the embodiments of the present application may indicate a vehicle flameout state.

In some embodiments, the power supply apparatus further includes a first switch module and a second switch module. In one example, continuing to refer to FIG. 3, the specific implementation of S410 may include: controlling the first switch module 61 to turn on and the second switch module 62 to turn off.

In some embodiments, if the first switch module and the second switch module each include two transistors connected in series, the specific implementation of S410 may include: controlling the two transistors in the first switch module to turn on, and controlling the two transistors in the second switch module to turn off.

Exemplarily, continuing to refer to FIG. 3, the specific implementation of S410 may include: controlling the first MOS transistor SW1 and the second MOS transistor SW2 to turn on, and controlling the third MOS transistor SW3 and the fourth MOS transistor SW4 to turn off.

In this embodiment, when the first MOS transistor SW1 and the second MOS transistor SW2 are both turned on, current can pass through the sources and drains of the two MOS transistors, which reduces the energy loss of the body diodes, and improves the power supply efficiency.

In some embodiments, the BMS may obtain the state of the vehicle through a vehicle controller.

At this time, the specific implementation of S410 may include step 1 and step 2.

Step 1: receiving notification information sent by the vehicle controller of the vehicle.

In some embodiments, the vehicle controller may determine that the vehicle is in the parking state or the driving state, and inform the BMS of the state of the vehicle in the form of notification information. Specifically, the vehicle controller and the BMS can be wired or wirelessly connected. Exemplarily, the vehicle controller and the BMS may be connected in a controller area network (CAN) bus communication mode. Correspondingly, the specific form of the notification information may be a CAN message.

Step 2: controlling, in response to the notification information and under a condition that the notification information indicates that the vehicle is in the parking state, the first battery pack to supply power to the first load, and controlling the first battery pack and the second battery pack to stop supplying power to the second load.

Here, the specific content of step 2 is similar to the implementation of S410, and will not be repeated herein.

S420: acquiring, in a process of supplying power to the first load, a capacity parameter of the first battery pack.

Here, the specific content of the capacity parameter may refer to the relevant description in the above parts of the present application, which will not be repeated herein.

In some embodiments, in order to reasonably control the power supply apparatus, the capacity parameter of the first battery pack may be obtained every preset time interval.

In some embodiments, if the capacity parameter is the capacity of the first battery pack, the BMS may obtain the voltage of the first battery pack, and then determine the capacity of the first battery pack according to a corresponding relationship between the voltage and the capacity.

In other embodiments, if the capacity parameter is the SOC of the first battery pack, the BMS may obtain the voltage of the first battery pack, and then use a discharge experiment method, an ampere-hour integration method, a Kalman filter method, and a neural network method and the like to estimate the SOC of the first battery pack.

S430: controlling, under a condition that the capacity parameter of the first battery pack is lower than a first preset capacity threshold, the third DCDC converter to transmit electric energy of the second battery pack to the first battery pack.

Here, the magnitude of the first preset capacity threshold may be set according to specific scenarios and actual requirements, which is not limited herein.

In the control method for the power supply apparatus of the embodiment of the present application, under the condition that the vehicle is in the parking state, the first battery pack can be used to supply power to the first load of the vehicle. Further, during the process of supplying power, under the condition that the capacity parameter of the first battery pack is lower than the first preset capacity threshold, the third DCDC converter can transmit the energy of the second battery pack to the first battery pack. Therefore, during the process of the first battery pack supplying power to the load, the first battery pack can be supplemented with power according to the capacity parameter of the first battery pack, which makes the power supply strategy more flexible.

In some embodiments, in order to take into account the safety of the power supply apparatus and reduce energy consumption, the BMS may be awakened every preset time interval to perform the above S410-S430. In other words, the BMS is in a sleep state by default. If a wake-up signal is received, the BMS is powered on and executes the above steps. After the execution is completed, the BMS enters the sleep state again.

In some embodiments, in order to further improve the flexibility of the power supply scheme, the control method for the power supply apparatus further includes:

controlling, under a condition that the capacity parameter of the first battery pack is greater than or equal to the first preset capacity threshold, the third DCDC converter to stop working.

In one example, the third DCDC converter can be controlled to stop working.

Further, in addition to a method capable of controlling the power supply system when the vehicle is in the parking state, the embodiments of the present application also provide a method capable of controlling the power supply apparatus when the vehicle is in a driving state. The following parts will describe the method in detail in conjunction with the drawings.

Figure 5:
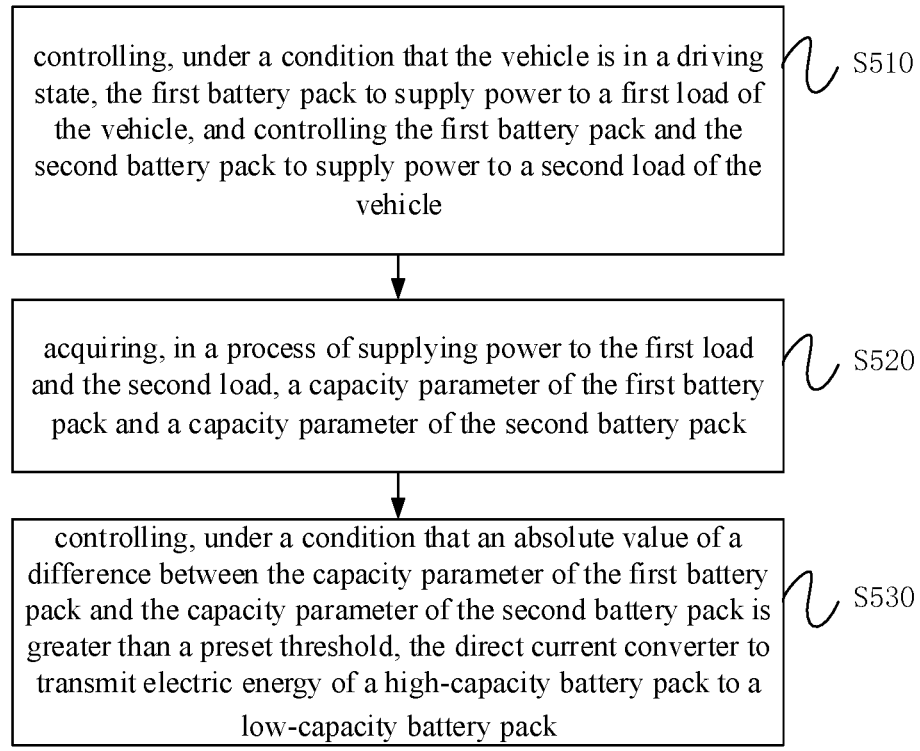
FIG. 5 is a schematic flowchart of another control method for a power supply apparatus provided by an embodiment of the present application.

FIG. 5 is a schematic flow chart of a control method for a power supply apparatus according to an embodiment of the present application. As shown in FIG. 5, the control method 500 for the power supply apparatus includes S510 to S530. Wherein, the execution subject of each step of the control method 500 for the power supply apparatus may be a BMS.

S510: controlling, under a condition that the vehicle is in a driving state, a first battery pack of the vehicle to supply power to a first load of the vehicle, and controlling the first battery pack and a second battery pack of the vehicle to supply power to a second load.

In some embodiments, the driving state in the embodiments of the present application may indicate that the vehicle is in a normal driving state.

In some embodiments, the power supply apparatus further includes a first switch module and a second switch module. In one example, continuing to refer to FIG. 3, the specific implementation of S510 may include: controlling the first switch module 61 to turn on and the second switch module 62 to turn on.

In some embodiments, if the first switch module and the second switch module each include two transistors connected in series, the specific implementation of S510 may include: controlling the two transistors in the second switch module to turn on, and controlling a first transistor in the first switch module to turn on.

Exemplarily, continuing to refer to FIG. 3, the specific implementation of S510 may include: turning on the third MOS transistor SW3 and the fourth MOS transistor SW4.

By controlling the two transistors in the second switch module to turn on, bidirectional energy transmission can be realized. When the second load of the vehicle stops working under the driving state, the electric energy output by the battery pack can flow back to the battery pack from the second load, thereby realizing energy recovery and improving electric energy utilization efficiency. Exemplarily, if the vehicle brakes or goes downhill during driving, the energy of the motor or generator can be returned to the battery pack, which improves the utilization rate of the electric energy.

In an embodiment, the way of turning on the first switch module may be determined further according to whether there is an external power supply apparatus for supplying power to the first load. Exemplarily, the external power supply apparatus may be a charging apparatus such as a charging pile or a car charger. In a feasible implementation, whether there is an external power supply apparatus for supplying power to the first load can be determined by determining whether a charging gun is inserted into a charging port of the first load.

Specifically, the specific control steps for the first switch module may include the following steps 1 and 2.

Step 1: controlling, under a condition that it is determined that there is an external power supply apparatus for supplying power to the first load 71, the first transistor in the first switch module 61 to turn on and a second transistor in the first switch module to turn off.

Exemplarily, continuing to refer to FIG. 3, the specific implementation of S510 may include: controlling the first MOS transistor SW1 to turn on, and controlling the second MOS transistor SW2 to turn off.

In this example, the first transistor can be set to conduct unidirectionally, that is, the current can flow from the first battery pack to the first load, but cannot flow from the first load to the first battery pack. Through this example, when the external power supply apparatus charges the first load, the current of the external power supply apparatus will not flow into the first battery pack, thereby ensuring the safety of the first battery pack. When the external power supply apparatus fails, the current of the first battery pack can sequentially pass through the drain and source of the first transistor and the body diode of the second transistor of the first switch module, to supply power to the first load. Therefore, even when the external power supply apparatus fails, the normal operation of the vehicle can be ensured, and the safety of the vehicle can be improved.

Step 2: controlling, under a condition that it is determined that there is no external power supply apparatus for supplying power to the first load, the first transistor and the second transistor in the first switch module to turn on.

Exemplarily, continuing to refer to FIG. 3, the specific implementation of S510 may include: controlling the first MOS transistor SW1 and the second MOS transistor SW2 to turn on.

In this embodiment, when the first transistor and the second transistor in the first switch module are both in a turned on state, the current can pass through the sources and drains of the two transistors, thereby reducing the energy loss of the body diodes, and improving the power supply efficiency.

Correspondingly, through the above two steps, a corresponding switch control strategy can be selected according to whether there is an external power supply apparatus for supplying power to the first load, which ensures the safety of the vehicle while taking into account the power supply efficiency and improves the flexibility of the overall control scheme.

In some embodiments, the BMS may obtain the state of the vehicle through a vehicle controller.

At this time, the specific implementation of S510 may include step 3 and step 4.

Step 3: receiving notification information sent by the vehicle controller of the vehicle.

It should be noted that, the implementation of step 3 is similar to the specific content of step 1 in S410, and will not be repeated herein.

Step 4: controlling, in response to the notification information and under a condition that the notification information indicates that the vehicle is in the driving state, the first battery pack to supply power to the first load, and controlling the first battery pack and the second battery pack to supply power to the second load.

Here, the specific content of step 4 is similar to the foregoing specific implementation of S510, and will not be repeated herein.

S520: acquiring, in a process of supplying power to the first load and the second load, a capacity parameter of the first battery pack and a capacity parameter of the second battery pack.

Here, the specific implementation of S520 is similar to that of S420, and will not be repeated herein.

S530: controlling, under a condition that an absolute value of a difference between the capacity parameter of the first battery pack and the capacity parameter of the second battery pack is greater than a preset threshold, the third DCDC converter to transmit electric energy of a high-capacity battery pack to a low-capacity battery pack. Wherein the high-capacity battery pack is a battery pack with a higher capacity parameter of the first battery pack and the second battery pack, and the low-capacity battery pack is a battery pack with a lower capacity parameter of the first battery pack and the second battery pack of the vehicle.

In other words, there are two situations in S530:

In a first situation, if the capacity parameter of the first battery pack is greater than the capacity parameter of the second battery pack, and the difference between the two capacity parameters is greater than the preset threshold, then the third DCDC converter is controlled to transmit the electric energy of the first battery pack to the second battery pack.

In a second situation, if the capacity parameter of the second battery pack is greater than the capacity parameter of the first battery pack, and the difference between the two capacity parameters is greater than the preset threshold, the third DCDC converter is controlled to transmit the electric energy of the second battery pack to the first battery pack.

Exemplarily, when the vehicle is running, the capacity of the first battery pack is greater than the capacity of the second battery pack, and the power consumption of the second battery pack is often faster. When the BMS determines that the difference between the capacity parameters of the first battery pack and the second battery pack is greater than the preset threshold, the first battery pack can be used to supplement power for the second battery pack.

In the control method for the power supply apparatus of the embodiment of the present application, under the condition that the vehicle is in the driving state, the first battery pack can be used to supply power to the first load of the vehicle, and the first battery pack and the second battery pack can be used together to supply power to the second load. Further, during the process of supplying power, the third DCDC converter can supplement power between the two battery packs according to the capacity parameters of the first battery pack and the second battery pack, and can balance electric quantities of the two battery packs, thereby making the power supply strategy more flexible.

In some embodiments, in order to further improve the flexibility of the power supply scheme, the control method for the power supply apparatus further includes:

controlling, under a condition that the absolute value of the difference is less than or equal to the preset threshold, the third DCDC converter to stop working.

In an example, the third DCDC converter can be controlled to stop working.

Based on the same application concept, in addition to providing the control method for the power supply apparatus applied when the vehicle is in the parking state, the embodiments of the present application also provide a corresponding BMS.

The BMS according to the embodiments of the present application will be described in detail below with reference to the accompanying drawings.

Figure 6:
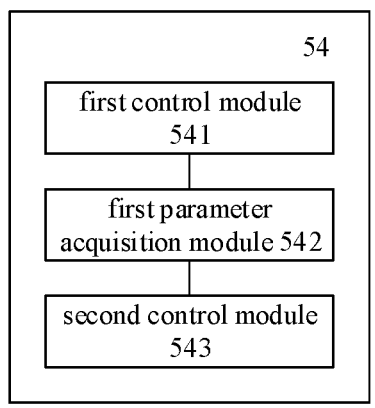
FIG. 6 is a schematic structural diagram of a BMS provided by an embodiment of the present application.

FIG. 6 is a schematic structural diagram of a BMS provided by an embodiment of the present application. As shown in FIG. 6, the BMS 54 includes a first control module 541, a first parameter acquisition module 542 and a second control module 543.

The first control module 541 is configured to control, under a condition that the vehicle is in a parking state, a first battery pack of a power supply apparatus to supply power to a first load of the vehicle, and to control the first battery pack and a second battery pack of the power supply apparatus to stop supplying power to a second load of the vehicle;

The first parameter acquisition module 542 is configured to acquire, in a process of supplying power to the first load, a capacity parameter of the first battery pack;

The second control module 543 is configured to control, under a condition that the capacity parameter of the first battery pack is lower than a first preset capacity threshold, the third DCDC converter to transmit electric energy of the second battery pack to the first battery pack.

In some embodiments of the present application, the first load includes a low-voltage electrical device of the vehicle; the second load includes a motor of the vehicle and/or an engine of the vehicle.

In some embodiments of the present application, the first control module 541 specifically includes:

a receiving unit configured to receive notification information sent by a vehicle controller of the vehicle;

a control unit configured to control, in response to the notification information and under a condition that the notification information indicates that the vehicle is in the parking state, the first battery pack to supply power to the first load, and to control the first battery pack and the second battery pack to stop supplying power to the second load.

In some embodiments of the present application, the apparatus further includes:

a fifth control module configured to control, under a condition that the capacity parameter of the first battery pack is greater than or equal to the first preset capacity threshold, the third DCDC converter to stop working.

In some embodiments of the present application, the power supply apparatus further includes: a first switch module and a second switch module, wherein, a positive electrode of the first battery pack is connected to a negative electrode of the second battery pack, the positive electrode of the first battery pack is also connected to one terminal of the first load via the first switch module, and a negative electrode of the first battery pack is connected to a first reference potential, wherein the other terminal of the first load is connected to a second reference potential, a positive electrode of the second battery pack is connected to one terminal of the second load via the second switch module, wherein the other terminal of the second load is connected to a third reference potential, one terminal of the third DCDC converter is connected to the positive electrode of the first battery pack, and the other terminal of the third DCDC converter is connected to the positive electrode of the second battery pack.

Correspondingly, the first control module 541 is specifically configured to:

control the first switch module to turn on and control the second switch module to turn off.

In some embodiments of the present application, the first switch module and the second switch module each include two transistors connected in series, and sources of the two transistors connected in series are connected; wherein each of the transistors is connected to a corresponding body diode, the source of each of the transistors is connected to an anode of the corresponding body diode, and a drain of each of the transistors is connected to a cathode of the corresponding body diode, wherein the drain of a first transistor of the first switch module is connected to the positive electrode of the first battery pack;

Correspondingly, the first control module 541 is specifically configured to: control the two transistors in the first switch module to turn on, and control the two transistors in the second switch module to turn off.

In the battery management system of the embodiment of the present invention, under the condition that the vehicle is in the parking state, the first battery pack can be used to supply power to the first load of the vehicle. Further, during the process of supplying power, under the condition that the capacity parameter of the first battery pack is lower than the first preset capacity threshold, the third DCDC converter can transmit the energy of the second battery pack to the first battery pack. Therefore, during the process of the first battery pack supplying power to the load, the first battery pack can be supplemented with power according to the capacity parameter of the first battery pack, which makes the power supply strategy more flexible.

Other details of the BMS according to the embodiment of the present application are similar to the control method for the power supply apparatus described above in conjunction with the example shown in FIG. 4, and may achieve the corresponding technical effects. For concise description, it will not be repeated herein.

Based on the same application concept, in addition to providing the control method for the power supply apparatus applied when the vehicle is in the driving state, the embodiments of the present application also provide a corresponding BMS.

The BMS according to the embodiments of the present application will be described in detail below with reference to the accompanying drawings.

Figure 7:
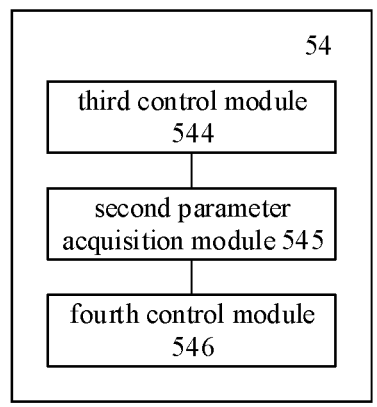
FIG. 7 is a schematic structural diagram of another BMS provided by an embodiment of the present application.

FIG. 7 is a schematic structural diagram of another BMS provided by an embodiment of the present application. As shown in FIG. 7, the BMS 54 includes a third control module 544, a second parameter acquisition module 545, and a fourth control module 546.

The third control module 544 is configured to control, under a condition that the vehicle is in a driving state, a first battery pack of the vehicle to supply power to a first load of the vehicle, and to control the first battery pack and a second battery pack of the vehicle to supply power to a second load;

The second parameter acquisition module 545 is configured to acquire, in a process of supplying power to the first load and the second load, a capacity parameter of the first battery pack and a capacity parameter of the second battery pack;

The fourth control module 546 is configured to control, under a condition that an absolute difference between the capacity parameter of the first battery pack and the capacity parameter of the second battery pack is greater than a preset threshold, the third DCDC converter to transmit electric energy of a high-capacity battery pack to a low-capacity battery pack, wherein the high-capacity battery pack is a battery pack with a higher capacity parameter of the first battery pack and the second battery pack, and the low-capacity battery pack is a battery pack with a lower capacity parameter of the first battery pack and the second battery pack of the vehicle.

In some embodiments of the present application, the first load includes a low-voltage electrical device of the vehicle; the second load includes a motor of the vehicle and/or an engine of the vehicle.

In some embodiments of the present application, the third control module 544 specifically includes:

a receiving unit configured to receive notification information sent by a vehicle controller of the vehicle;

a first control unit configured to control, in response to the notification information and under a condition that the notification information indicates that the vehicle is in the driving state, the first battery pack to supply power to the first load, and to control the first battery pack and the second battery pack to supply power to the second load.

In some embodiments of the present application, the apparatus further includes:

a sixth control module configured to control, under a condition that the absolute difference is less than or equal to the preset threshold, the third DCDC converter to stop working.

In some embodiments of the present application, the power supply apparatus further includes: a first switch module and a second switch module, wherein, a positive electrode of the first battery pack is connected to a negative electrode of the second battery pack, the positive electrode of the first battery pack is also connected to one terminal of the first load via the first switch module, and a negative electrode of the first battery pack is connected to a first reference potential, wherein the other terminal of the first load is connected to a second reference potential, a positive electrode of the second battery pack is connected to one terminal of the second load via the second switch module, wherein the other terminal of the second load is connected to a third reference potential, one terminal of the third DCDC converter is connected to the positive electrode of the first battery pack, and the other terminal of the third DCDC converter is connected to the positive electrode of the second battery pack;

Correspondingly, the third control module 544 is specifically configured to: control the first switch module to turn on and control the second switch module to turn on.

In some embodiments of the present application, the first switch module and the second switch module each include two transistors connected in series, and sources of the two transistors connected in series are connected; wherein each of the transistors is connected to a corresponding body diode, the source of each of the transistors is connected to an anode of the corresponding body diode, and a drain of each of the transistors is connected to a cathode of the corresponding body diode, wherein the drain of a first transistor of the first switch module is connected to the positive electrode of the first battery pack;

Correspondingly, the third control module 544 is specifically configured to: control the two transistors in the second switch module to turn on, and control the first transistor in the first switch module to turn on.

In some embodiments of the present application, the third control module 544 specifically includes:

a second control unit configured to control, under a condition that it is determined that there is an external power supply apparatus for supplying power to the first load, the first transistor in the first switch module to turn on and a second transistor in the first switch module to turn off.

a third control unit configured to control, under a condition that it is determined that there is no external power supply apparatus for supplying power to the first load, the first transistor and the second transistor in the first switch module to turn on.

In the BMS of the embodiment of the present invention, under the condition that the vehicle is in the driving state, the first battery pack can be used to supply power to the first load of the vehicle, and the first battery pack and the second battery pack can be used together to supply power to the second load. Further, during the process of supplying power, the third DCDC converter can supplement power between the two battery packs according to the capacity parameters of the first battery pack and the second battery pack, and can balance electric quantities of the two battery packs, thereby making the power supply strategy more flexible.

Other details of the BMS according to the embodiment of the present application are similar to the control method for the power supply apparatus described above in conjunction with the example shown in FIG. 5, and may achieve the corresponding technical effects. For concise description, it will not be repeated herein.

Figure 8:
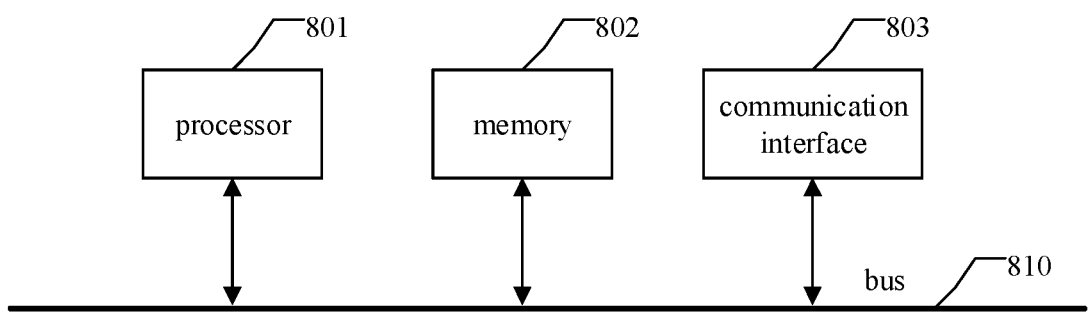
FIG. 8 illustrates a schematic diagram of a hardware structure of a BMS provided by an embodiment of the present application.

FIG. 8 illustrates a schematic diagram of a hardware structure of a BMS provided by an embodiment of the present application.

The BMS may include a processor 801 and a memory 802 storing computer program instructions.

Specifically, the above processor 801 may include a central processing unit (CPU), or an application specific integrated circuit (ASIC), or may be configured to implement one or more integrated circuits according to the embodiments of the present application.

The memory 802 may include a mass storage for data or instructions. By way of examples rather than limitation, the memory 802 may include a hard disk drive (HDD), a floppy disk drive, a flash memory, an optical disk, a magneto-optical disk, a magnetic tape or a universal serial bus (USB) drive, or a combination of two or more of them. Where appropriate, the memory 802 may include a removable or non-removable (or fixed) medium. Where appropriate, the memory 802 may be internal or external to the BMS. In a particular embodiment, the memory 802 may be a non-volatile solid state memory.

The memory may include a read-only memory (ROM), a random access memory (RAM), a magnetic disk storage media device, an optical storage media device, a flash memory device, an electrical, optical, or other physical/tangible memory storage device. Therefore, in general, the memory includes one or more tangible (non-transitory) computer-readable storage media (for example, a memory device) encoded with software including computer-executable instructions, and when executed (for example, by one or more processors), the software is operable to perform the operations described with reference to the method according to one aspect of the present disclosure.

The processor 801 reads and executes the computer program instructions stored in the memory 802 to implement any of the control methods of the power supply apparatus in the foregoing embodiments.

In one example, the BMS may further include a communication interface 803 and a bus 810. Here, as shown in FIG. 8, the processor 801, the memory 802, and the communication interface 803 are connected through the bus 810 and communicate with each other.

The communication interface 803 may be mainly used to implement communications among various modules, apparatuses, units, and/or devices in the embodiments of the present application.

The bus 810 may include a hardware, a software, or both, and may couple the components of the battery management system to each other. By way of examples rather than limitation, the bus may include an Accelerated Graphics Port (AGP) or other graphics buses, an Enhanced Industry Standard Architecture (EISA) bus, a Front Side Bus (FSB), a Hypertransport (HT) interconnect, an Industry Standard Architecture (ISA) Bus, an infinite bandwidth interconnect, a Low Pin Count (LPC) bus, a memory bus, a Microchannel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus, or other suitable buses, or a combination of two or more of them. Where appropriate, the bus 810 may include one or more buses. Although specific buses are described and illustrated in the embodiments of the present application, the present application may contemplate any suitable bus or interconnect.

The BMS may execute the control method for the power supply apparatus in the embodiments of the present application, thereby implementing the control method for the power supply apparatus and the BMS described in conjunction with FIG. 4 and FIG. 7.

In addition, in combination with the control methods of the power supply apparatus in the foregoing embodiments, the embodiments of the present application may be implemented by a computer storage medium. The computer storage medium may store computer program instructions thereon; the computer program instructions may implement, when executed by a processor, any of the control methods of the power supply apparatus in the foregoing embodiments.

It should be noted that the present application is not limited to the specific configurations and processes described above and shown in the figures. For simplicity, a detailed descriptions of well-known methods are omitted herein. In the above embodiments, several specific steps are described and shown as examples. However, the flow of the methods of the present application is not limited to the specific steps described and shown, those skilled in the art can make various changes, modifications and additions, or change the order of the steps, after understanding the gist of the present application.

Functional blocks shown in the above structural diagrams may be implemented as hardware, software, firmware, or a combination thereof. When implemented in hardware, the functional blocks may be, for example, an electronic circuit, an Application Specific Integrated Circuit (ASIC), a suitable firmware, a plug-in, a function card and the like. When implemented in software, elements of the present disclosure may be programs or code segments used to perform the required tasks. The programs or code segments may be stored in a machine-readable medium or transmitted over a transmission medium or a communication link via data signals carried in carriers. The "machine-readable medium" may include any medium capable of storing or transmitting information. Examples of the machine-readable medium may include an electronic circuit, a semiconductor memory device, a ROM, a flash memory, an erasable ROM (EROM), a floppy disk, a CD-ROM, an optical disk, a hard disk, a fiber medium, a Radio Frequency (RF) link, and the like. The code segments may be downloaded via a computer network, for example, the Internet, an intranet, and the like.

It should be further noted that exemplary embodiments mentioned in the present application describe some methods or systems based on a series of steps or apparatuses. However, the present application is not limited to the above described order of the steps, that is, the steps may be executed in the order mentioned in embodiments, or an order different from that in the embodiments, or several steps may be executed simultaneously.

Various aspects of the present disclosure have been described above with reference to the flowcharts and/or block diagrams of the methods, apparatuses, devices, and computer program products according to the embodiments of the present disclosure. It should be understood that, each block in the flowcharts and/or block diagrams and combinations of blocks in the flowcharts and/or block diagrams can be implemented by computer program instructions. These computer program instructions can be provided to a processor of a general-purpose computer, a special-purpose computer, or other programmable data processing devices, to produce a machine, which may cause these instructions to be executed via the processor of a computer or other programmable data processing device to enable the realization of the functions/actions specified in one or more blocks of the flowcharts and/or block diagrams. Such a processor may be, but is not limited to, a general-purpose processor, a dedicated processor, a special application processor, or a field programmable logic circuit. It can also be understood that, each block in the block diagrams and/or flowcharts and combinations of blocks in the block diagrams and/or flowcharts can also be implemented by dedicated hardware that performs specified functions or actions, or can be implemented by a combination of the dedicated hardware and computer instructions.

Although the present application has been described with reference to preferred embodiments, various modifications may be made thereto and components thereof may be replaced with their equivalents, without departing from the scope of the present application. In particular, as long as there is no structural conflict, various technical features mentioned in various embodiments can be combined in any manner. The present application is not limited to the specific embodiments disclosed herein, and instead, includes all the technical solutions that fall within the scope of the claims.

What is claimed is:

1. A control method for power supply, comprising:
controlling, by a battery management system (BMS) of a vehicle, under a condition that the vehicle is in a driving state, a first battery pack to supply power to a first load of the vehicle, and controlling the first battery pack and a second battery pack connected in series to supply power to a second load of the vehicle;
acquiring, by the BMS, a capacity parameter of the first battery pack and a capacity parameter of the second battery pack;
controlling, by the BMS, under a condition that an absolute value of a difference between the capacity parameter of the first battery pack and the capacity parameter of the second battery pack is greater than a preset threshold, a direct current converter to transmit electric energy of a high-capacity battery pack to a low-capacity battery pack,
wherein the high-capacity battery pack is a battery pack with a higher capacity parameter of the first battery pack and the second battery pack, and the low-capacity battery pack is a battery pack with a lower capacity parameter of the first battery pack and the second battery pack.

2. The method of claim 1, wherein the controlling, by the battery management system (BMS) of the vehicle, under a condition that the vehicle is in the driving state, the first battery pack to supply power to the first load of the vehicle and controlling the first battery pack and the second battery pack connected in series to supply power to the second load of the vehicle, comprises:
receiving, by the BMS, notification information sent by a vehicle controller of the vehicle;
controlling, by the BMS, under a condition that the notification information indicates that the vehicle is in the driving state, the first battery pack to supply power to the first load of the vehicle, and controlling the first battery pack and the second battery pack connected in series to supply power to the second load of the vehicle.

3. The method of claim 1, wherein the method further comprising:
controlling, by the BMS, under a condition that the absolute value of the difference is less than or equal to the preset threshold, the direct current converter to stop working.

4. The method of claim 2, wherein receiving, by the BMS, notification information sent by a vehicle controller of the vehicle, comprises:
receiving, by the BMS, the notification information sent by the vehicle controller of the vehicle through wired or wireless connection mode.

5. The method of claim 4, wherein the wired connection mode comprises a controller area network (CAN) bus communication mode.

6. The method of claim 1, wherein the first load comprises a low-voltage electrical device of the vehicle, and the second load comprises a motor of the vehicle and/or an engine of the vehicle.

7. The method according to claim 1, wherein the direct current converter is a bidirectional Direct Current-Direct Current (DCDC) converter.

8. A battery management system (BMS), the BMS being installed in a vehicle and comprising:
a memory storing computer program instructions; and
a processor, configured to, when the computer program instructions executed, under a condition that the vehicle is in a driving state, control a first battery pack to supply power to a first load of the vehicle, and controlling the first battery pack and the second battery pack connected in series to supply power to a second load of the vehicle;

acquire a capacity parameter of the first battery pack and a capacity parameter of the second battery pack;

under a condition that an absolute value of a difference between the capacity parameter of the first battery pack and the capacity parameter of the second battery pack is greater than a preset threshold, control a direct current converter to transmit electric energy of a high-capacity battery pack to a low-capacity battery pack, wherein the high-capacity battery pack is a battery pack with a higher capacity parameter of the first battery pack and the second battery pack, and the low-capacity battery pack is a battery pack with a lower capacity parameter of the first battery pack and the second battery pack.

9. The BMS according to claim 8, wherein the processor is configured to:

receive notification information sent by a vehicle controller of the vehicle;

under a condition that the notification information indicates that the vehicle is in the driving state, control the first battery pack to supply power to the first load of the vehicle, and control the first battery pack and the second battery pack connected in series to supply power to the second load of the vehicle.

10. The BMS according to claim 8, wherein the processor is further configured to:

under a condition that the absolute value of the difference is less than or equal to the preset threshold, control the direct current converter to stop working.

11. The BMS according to claim 9, wherein the processor is configured to:

receive the notification information sent by the vehicle controller of the vehicle through wired or wireless connection mode.

12. The BMS according to claim 11, wherein the processor is configured to:

receive the notification information sent by the vehicle controller of the vehicle through the wired connection mode, wherein the wired connection mode comprises a controller area network (CAN) bus communication mode.

13. A non-transitory computer-readable storage device, wherein a computer program is stored in the storage device, and, when being executed by a computer, the computer program performs a control method for power supply, and the method comprises:

under a condition that the vehicle is in a driving state, controlling a first battery pack to supply power to a first load of the vehicle, and controlling the first battery pack and the second battery pack connected in series to supply power to a second load of the vehicle;

acquiring a capacity parameter of the first battery pack and a capacity parameter of the second battery pack;

controlling under a condition that an absolute value of a difference between the capacity parameter of the first battery pack and the capacity parameter of the second battery pack is greater than a preset threshold, a direct current converter to transmit electric energy of a high-capacity battery pack to a low-capacity battery pack, wherein the high-capacity battery pack is a battery pack with a higher capacity parameter of the first battery pack and the second battery pack, and the low-capacity battery pack is a battery pack with a lower capacity parameter of the first battery pack and the second battery pack.

\* \* \* \* \*